June 14, 1932. H. HÜRLIMANN 1,863,444
TEDDER
Filed Aug. 22, 1929 2 Sheets-Sheet 1

Inventor
Hans Hürlimann
By B. Singer, atty.

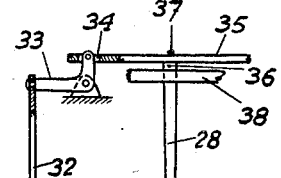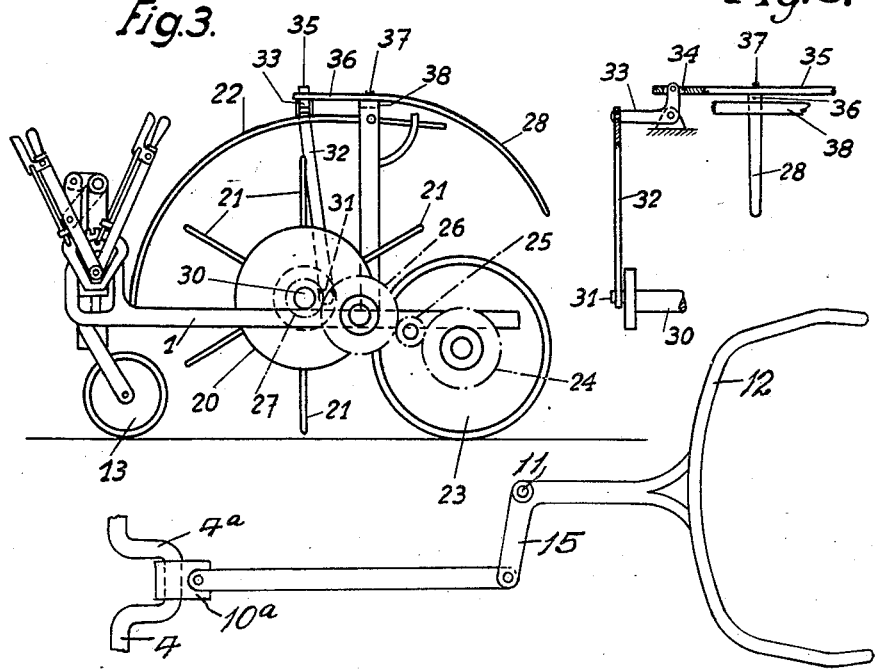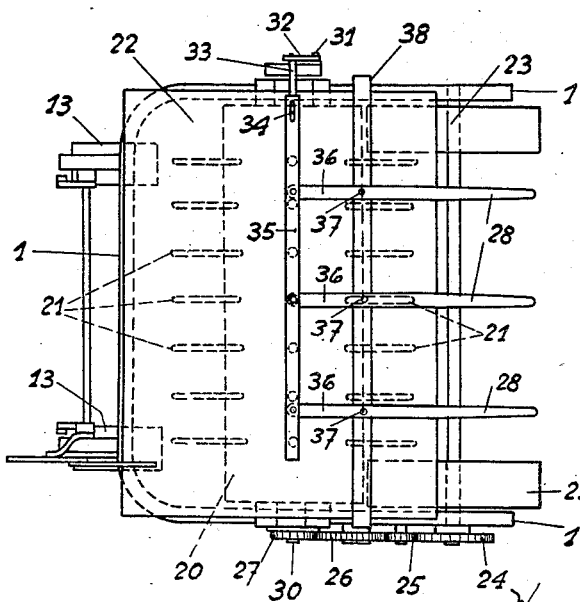

Patented June 14, 1932

1,863,444

UNITED STATES PATENT OFFICE

HANS HÜRLIMANN, OF KIRCHBERG, SWITZERLAND

TEDDER

Application filed August 22, 1929, Serial No. 387,746, and in Switzerland August 28, 1928.

The present invention relates to improvements in tedders for shaking up the grass or the hay thereby expediting the drying thereof.

The main object of the invention is to provide a tedder which might be used to shake-up the grass which has been cut by a mowing machine or mowed by hand labor and lying in swaths or in heaps.

A further object of the invention is to provide a tedder which may be used as an attachment for mowing machines of any conventional type to shake-up the grass immediately after cutting or which can form a machine per se moved by draft animals or tractors.

A still further object in the provision of a device which after having detached certain parts can be used to turn hay or/and to turn and spread swaths made by side delivery rates.

I attain these and other objects by a device which lifts the grass from the ground and throws it to the ground again, an oscillating shaking implement being arranged in the path of the falling grass and moving across the path of the grass reciprocating at a suitable speed either in horizontal plane or in any other suitable plane.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in the figures.

In the drawings two tedders according to my invention are shown in a diagrammatical manner.

Fig. 3 is a side elevation of the second form of construction,

Fig. 4 is a top view thereof,

Fig. 5 shows the means to reciprocate the shaking implement,

Figure 8:
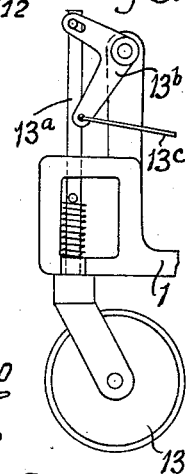
Figure 6:
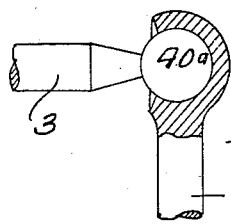

Fig. 6 is a detail elevation partly in section of the ball and socket joint between the members 3, 40, Fig. 7 is a detail plan of the member 12, shaft 4 and connecting mechanism, Fig. 8 is a detail elevation of one of the front wheels and its operating connections.

1 denotes a frame running on wheels 9, 13, which frame 1 can be attached to a mowing machine or to a tractor or which can be provided with a draft attachment to be drawn by animals. The wheels are made and mounted in the usual manner in hay making machinery. In the frame 1 a number of shaking members 3 are arranged close and parallel to each other. The rear end of each member 3 is linked to a lever 40, preferably by a ball and socket 46ª as shown in detail in Fig. 6, and all the levers 40 are rotatably mounted on a shaft 2 fixed to the frame 1. The fore end of each member 3 is provided with a fork adapted to take grass from the ground. Each member 3 is mounted on a crank of a crank shaft 4 rotatably mounted in the frame 1 beneath said members 3 and running at right angles thereto. The crank shaft 4 is driven from the shaft 8 of the wheels 9 by means of a pair of bevel wheels 7 shaft 6 and a second pair of bevel gears 5. The different cranks on which the members are mounted are set at equal angles with reference to each other. On the members 3 racks 14 are provided to retain the grain, which is being moved upwards by the action of the members on rotation of the crank shaft 4. The grass which is being fetched by the forks 41 is thrown upwards on to the members and is moved step by step up to the upper end, of the members 3. The members 3 moving up and down and at different times tear the grass asunder and spread it evenly over all the members. At the hind end of the machine a fork 12 is arranged projecting in the path of the grass falling down from the hind ends of the members 3.

Figure 2:
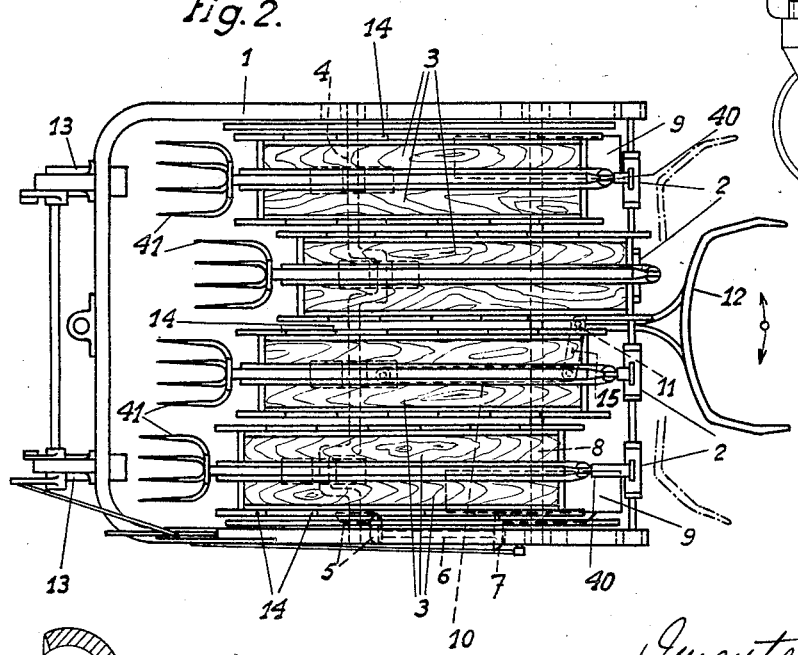
Fig. 2 is a top view thereof.

The fork 12 is reciprocated laterally in a horizontal plane between the limits denoted by broken lines (Fig. 2) and serves to distribute the grass. Said fork 12 is rotatably mounted on a vertical stud 11 of the frame 1 and is provided with an arm 15. The shaft 4 has a crank 4ª and a rod 10 is connected at one end to the wrist of said crank as at 10ª and at the rear end is connected to the arm 15 as shown in Fig. 7.

Figure 1:
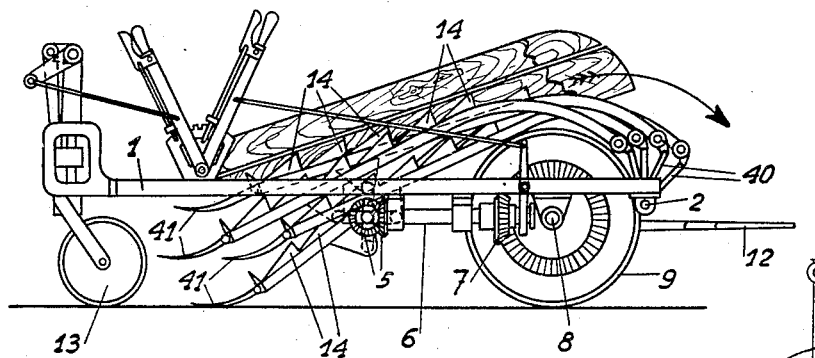
Fig. 1 is a side elevation of the first form of construction.

In the construction shown in Figs. 3 to 5 a drum 20 is rotatably mounted in the frame 1 of the tedder. The frame 1 is mounted on wheels 13, 23, of which the wheels 13 are adjustable in height by means of castor pintles 13ª, bell crank lever 13ᵇ, rod 13ᶜ and lever 13ᵈ as shown in Figs. 1 and 8. The drum 20 is provided with several rows of tines 21 which catch the grass from the ground and throw it along a hood 22 of sheet metal. The hood 22 runs concentric to the shaft 30 of the drum 20 and the grass is thrown upwards and backwards by the aid of said hood. The drum 20 is driven by the rear shaft 23ª on which the wheels 23 are fastened by means of a train of spur wheels 24, 25, 26 and 27 the spur wheel 27 being keyed on to the shaft 30, the gears 25 and 26 are rotatably mounted on studs of the frame 1. On the shaft 30 a disk is fixed carrying a crank pin 31. Said crank reciprocates a lever 33 by means of a connecting rod 32. The vertical arm of said lever engages in a slot 34 of a bar 35, on to which the arms 36 of shaking members 28 are linked. The members 28 are pivoted at 37 on a crossbar 38 of the frame 1. The free ends of the members 28 project in the path of the grass thrown backwardly by the drum and by reciprocating the members 28 spread the grass while it is falling.

In both of the examples shown and described the parts 12 or 28 might be done away with, and the tedder might be used to turn hay, etc.

The number and position of the shaking members can be varied to suit the length of the grass to be worked, etc.

What I wish to claim and secure by the U. S. Letters Patent, is:—

1. A tedder comprising in combination a frame, wheels supporting said frame, means to lift grass from the ground and to throw it backwardly, shaking means projecting in the path of the falling grass and reciprocating in horizontal planes.

2. A tedder comprising in combination a frame, wheels supporting said frame, a number of parallel slanting feeding members, a crank shaft supporting said members, a crank for each of said members, the cranks being set at angles apart, forks at the lower end of said members, links connecting the upper end of said members to a cross rod, a fork mounted in the frame to swing in a horizontal plane, and means to reciprocate said fork.

In testimony whereof I affix my signature.

HANS HÜRLIMANN.